Patented Oct. 31, 1950

2,528,378

UNITED STATES PATENT OFFICE 2,528,378

METAL SALTS OF SUBSTITUTED QUATERNARY HYDROXY CYCLOIMIDINIC ACID METAL ALCOHOLATES AND PROCESS FOR PREPARATION OF SAME

Hans S. Mannheimer, New York, N. Y., assignor to John J. McCabe, Jr., and Hans S. Mannheimer, as joint venturers No Drawing. Application September 20, 1947, Serial No. 775,377

12 Claims. (Cl. 260—309.6)

This invention relates to novel compositions of matter and to methods for producing and employing them. More particularly this invention relates to novel compounds finding application in a wide variety of different fields and to methods for preparing said compounds. The novel compositions of this invention have high detergent, foaming, wetting, emulgating, emulsifying, dispersing, bacteriastatic, bacteriacidal, fungicidal, and deodorizing characteristics. They are highly water-soluble, stable in aqueous solutions in the pH range of 1-14 and are not precipitated out of solution by the salts normally present in hard water. They are non-vesicant and non-toxic to human and animal life and may be introduced into the blood stream without ill effects. These novel compounds, which are surface active agents, serve as excellent synthetic detergents, softeners and dye assistants in the textile and related fields and especially in washing and cleansing of cotton fibers and textiles. These novel compounds may also be employed as therapeutic agents and are especially useful as germicides, fungicides and antisepticides.

Each of the compounds of the present invention is a metal salt of substituted quaternary hydroxy cycloimidinic acid metal alcoholate. The compounds of this invention have the following general formula:

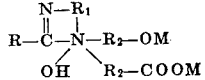

in which R is the organic radical which if connected to a carboxyl group provides a monocarboxylic acid and said radical contains at least 4 carbon atoms; $R_1$ is an aliphatic hydrocarbon group of 1 to 4 carbon atoms or is an aryl hydrocarbon group, examples of which are —$CH_2$—, —$C_3H_6$—, —$C_4H_8$—, —$C_6H_4$—, and preferably —$C_2H_4$—, both $R_2$ radicals may be the same as or different from each other and in either case each is an aliphatic hydrocarbon group having 1 to 4 carbon atoms, such as, —$CH_2$—, —$C_2H_4$—, —$C_3H_6$—, and —$C_4H_8$— or any of the aforesaid groups, anyone or more of whose hydrogens may be hydroxy substituted, illustrative examples of which are —$CH_2$—CHOH—$CH_2$—, —$CH_2$—CHOH—CHOH—$CH_2$—, or anyone of the aforesaid groups either unsubstituted or hydroxy substituted and having a single ether (—O—) or keto (—CO—) linkage therein; illustrative examples of which are —$C_2H_4$—O—$C_2H_4$—, —$CH_2$—CHOH—O—$C_2H_4$—, —$CH_2$—CO—$CH_2$—; both M radicals may be the same as or different from each other and each is a metal and preferably an alkali metal and for most purposes is sodium or potassium.

Various methods may be employed for the production of some of these novel compounds. One of the methods is to first react an ethanol ethylene diamine with an organic acid for the production of a cycloimidine. Then under specific and controlled conditions the cycloimidine is reacted with the metal salt of a monohalomonocarboxylic acid whereby a compound of an aforedefined formula is produced.

The organic acid reacted with said diamine is one containing a single COOH group or any of the available anhydrides of said acids and by the term monocarboxylic organic acid as used herein, I mean to include both the acid and the anhydride thereof which I regard as the equivalent of the acid. These acids may be: the aliphatic open chain saturated or unsaturated fatty acids as well as said fatty acids containing hydroxy or keto groups and/or other substituents, such as aryl radicals, as for example, acids of the type of Twitchell fatty acids; cycloaliphatic carboxylic acids preferably containing no more than 4 condensed nuclei and examples of which are hexahydrobenzoic, resinic, and naphthenic acids; heterocyclic aliphatic carboxylic acids, such as the various pyridine carboxylic acids.

While carboxylic acids having any number of carbon atoms may be employed, I prefer to employ those having at least 4 carbon atoms and preferably 4-18 carbon atoms in straight chain relationship. The acids which I employ may be derived from a number of different sources. Among some of them are the acid components chosen from oil or fats of animal, marine or vegetable origin and these include; the acids of cocoanut, palm kernel and palm oil, also from soy bean, linseed, olive, rapeseed, cottonseed, peanut and castor oil which contain large proportions of unsaturated hydroxy fatty acids and also the acids derived from tallow, fish and seal oils, whale or shark oils and the hydrogenated acids from these sources. Moreover, the synthetic high molecular weight fatty acids, obtained by the oxidation of paraffin wax and similar high molecular weight hydrocarbons by means of gaseous oxidizing agents may be employed. In addition the acid may be one of the resinic acids, such as abietic acid, or the naphthenic acids and long chain fatty acids having an aromatic hydrocarbon radical connected directly with the aliphatic chain (Twitchell fatty acids) as are obtainable from oleic, ricinoleic, linoleic and similar unsaturated fatty acids. Instead of employing mixture of acids from oil, fats and resins, single acids may be used, for example, caproic, pimelic, heptylic, caprylic, undecylic, lauric, palmitic, stearic, behenic, arachic, cerotic, oleic, erucic, linoleic, linolenic, ricinoleic and hydroxystearic acids.

Of the aforesaid diamines I prefer to employ aminoethylethanolamine

hereinafter referred to as Reactant A. Because it is commercially available in large quantities, its use provides for efficient production of the end product when employed in my process and will amply illustrate the invention. Among some of the salts of the halo acids which I prefer to employ are the sodium and potassium salts of monochloracetic acid, monochlorpropionic acid and monochlorlactic acid.

One of the general types of method which may be employed for the production of these novel compounds consists in first reacting one mol of a monocarboxylic acid having at least 4 carbon atoms in its radical connected to its COOH group with one mol of aminoethylethanolamine until 2 mols of water have been removed. In carrying out this reaction the mixture is first heated to about 110–230° C. in vacuum of 90–130 mm. of mercury pressure until one mol of water has been removed and then at a pressure no greater than 30 mm. of mercury pressure until an additional mol of water has been removed. (All of the terms "mm." and "mm. pressure" as used in this entire description are intended to mean mm. of mercury pressure.) The reaction mass is then allowed to cool to room temperature and is then at elevated temperatures reacted with a monohalocarboxylic acid in the presence of 2.7–3 mols of caustic soda in aqueous solution. In one of its preferred forms one mol of said reaction mass is added to an aqueous solution containing one mol of the monohalocarboxylic and 2.2–2.5 and preferably 2.2 mols of caustic soda, which solution prior to the addition has been prepared and maintained at a temperature no greater than 20° C. The mix is heated to a temperature of 95° C. until the pH has been reduced from about 13 to 8–8.5 and there is no further change in pH upon continued heating at said temperature. Then there is added thereto an aqueous solution containing sufficient caustic soda to make the sum of the caustic soda employed in these two steps to 2.7–3 mols. This mass is maintained at a temperature of 95° C. until a one part sample thereof dissolves in 100 parts of water provides a sparkling clear solution which remains clear overnight and is an alkali metal salt of substituted quaternary hydroxy cycloimidinic acid alkali metal alcoholate.

The following are illustrative examples given merely for the purposes of specifically illustrating how some of the compounds of the present invention may be produced in accordance with the above procedure, all parts being given by weight unless otherwise specified:

Example 1

200 parts of lauric acid and 104 parts of Reactant A are placed in a reacting vessel and are heated sufficiently to melt the lauric acid whereupon an agitator located therein is started and mixes and maintains these components in mixed condition. While being constantly agitated the mix is heated under vacuum of about 110 mm. pressure for about 3 hours while gradually raising the temperature to 170° C. During this period 18 parts of water have been distilled off. Then the temperature of the entire mass is gradually raised to 220° C. over a period of about 2 hours while the mercury pressure has been decreased to a value no greater than 30 mm. Under these conditions 18 more parts of water are distilled off leaving behind in the reaction mass a 100% pure product which is a disubstituted cycloimidine which is a light colored viscous liquid at room temperature. Then this reaction product is allowed to cool to room temperature and the entire mass is added to a previously prepared solution produced by adding 96 parts of monochloracetic acid and 90 parts of caustic soda to 300 parts of water. This solution was prepared and maintained at a temperature below 20° C. before the addition of said di-substituted cycloimidine. This mixture is heated to 95° C. and maintained at this temperature for 2 hours. During this period the pH of the mix is reduced from approximately 13 to 8–8.5. At the end of this period the pH of this mass is no longer subject to change by continued heating at said temperature and a sample of the resulting product is water soluble to a sparkling clear solution which clouds upon standing. Then to said reaction mass there is added 25 additional parts of caustic soda dissolved in 21 parts of water and heating is continued to maintain said mass at about 95° C. for an additional 1 hour. At the end of this period the mass consists chiefly of a water solution of one of my novel products having the folllowing formula:

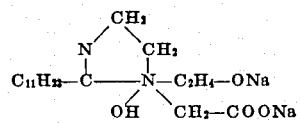

This compound at room temperature is a straw-colored solid having exceptional cleansing and foaming properties of high stability which make it particularly useful in the cleansing of cotton. It has also been found useful as a dye assistant in the textile industry and in the cosmetic industry as a shampoo base and bubble bath product.

Example 2

To the aqueous mass produced under the method of Example 1 and containing 389 parts of my novel product whose formula is defined therein there is added an aqueous solution consisting of 40 parts of caustic soda dissolved in 40 parts of water. Then to said mixture there are added 80.5 parts of chlorhydrin. This mixture which at this stage is at room temperature is heated over a period of 1 hour to 95° C. The mass is subsequently maintained at this temperature of 95° C. until there is no change in pH, this taking approximately 2 to 3 hours. The reaction consists essentially of an aqueous solution of another one of my novel products having the formula which is the same as that of Example 1, except that $C_2H_4$—O—$C_2H_4$—ONa is substituted for $C_2H_4$—ONa. This compound is a light amber-colored solid somewhat softer than the product of Example 1. At a pH of about 7, the foaming properties of this compound are superior to the corresponding characteristics of the compound of Example 1.

Example 3

172 parts of capric acid and 104 parts of Reactant A are heated and reacted under the same condition as given in Example 1, and 240 parts of the di-substituted cycloimidine produced thereby are introduced into a solution of 110 parts of monochlorpropionic acid and 90 parts of caustic soda in 300 parts of water prepared and maintained below 20° C. The resulting mixture is then heated under the same conditions as outlined in Example 1 until the resulting product forms sparkling clear aqueous solutions and is no longer subject to pH change in continued heating. Then 19 parts of caustic soda dissolved in 21 parts of water are added and heating continued for 1 hour at 95° C. At the end of this period the mass consists chiefly of an aqueous solution of one of my novel products having the formula the same as that of Example 1 except that $C_9H_{19}$ is substituted for $C_{11}H_{23}$ therein. This product is particularly suitable for shampoo and bar soap formulations because of its exceptional high foaming qualities.

Example 4

282 parts linseed fatty acid and 104 parts Reactant A are treated in the same manner as described in Example 1. The entire reaction product is then processed with an aqueous solution of 96 parts monochloracetic acid and 90 parts of caustic soda previously made and maintained below 20° C. and subsequently processed in the manner of Example 1 to produce reaction product having the same formula as that of Example 1 except that $C_{17}H_{31}$ is substituted for $C_{11}H_{23}$ therein. The resulting product is a straw to light-amber colored semi-solid having exceptional emulsification properties for all substances known to be emulsifiable, and exhibits the property of drying and oxidizing on aging, and therefore an emulsion prepared with this product as an emulsifier does not redissolve very rapidly with water.

Example 5

116 parts of caproic acid and 104 parts of Reactant A are condensed in the manner as described in the previous examples and the resulting reaction product is subsequently processed in the same manner as that set forth in the processing of the di-substituted cycloimidine of Example 4. The reaction product has the same formula as that of Example 1 except that $C_5H_9$ is substituted for $C_{11}H_{23}$ therein. This product is a viscous amber colored liquid and is a wetting agent for solutions of high solid content particularly those of caustic soda and sulfuric acid. Because of this the product is a valuable wetting agent in the mercerization of textiles and in acid pickling of metals.

Example 6

284 parts of stearic acid and 104 parts of Reactant A are heated in the like manner as described in previous examples, and the resulting reaction product is then introduced into an aqueous solution of 110 parts monochlorpropionic ac'd and 90 parts of caustic soda. The process is carried out in the same manner as described in the previous examples and there is produced a product having the same formula as that of Example 1, except that $C_{17}H_{35}$ is substituted for $C_{11}H_{23}$ therein. This product is a straw-colored hard solid and is particularly valuable as a softener for textiles and offers the advantage of being usable as a softener in the dyebath or as an aftertreatment in a pH range of 1–14. It exhibits substantivity but does precipitate dyestuffs.

Example 7

290 parts dodecyl benzoic acid and 104 parts of Reactant A are condensed in the manner described in Example 4 and the resultant product is processed in the manner of Example 4 whereby there is produced a novel compound having the same formula as that of Example 1, except that $C_{12}H_{25}C_6H_4$ is substituted for $C_{11}H_{23}$ therein. This product is a solid and is particularly valuable as a wetting agent.

Example 8

228 parts of myristic acid and 104 parts Reactant A are reacted in the manner described in Example 4 and the resultant product is processed in the manner of Example 4 whereby there is produced a novel compound having the same formula as that of Example 1, except that $C_{13}H_{27}$ is substituted for $C_{11}H_{23}$ therein. This product is a white to straw colored solid and is particularly suitable as a high temperature detergent and cleanser which may be combined with alkalies and other electrolytes commonly employed in the formulation of powdered cleaners. The product, furthermore, exhibits excellent foaming properties and good wetting qualities.

Still another type of methods may be employed to produce some of these compounds and examples thereof are shown hereinafter merely in an illustrative and not in a limiting sense.

Example 9

1 mol of lauric fatty acid ($C_{11}H_{23}COOH$) and 1 mol of ethylenediamine ($NH_2C_2H_4NH_2$) are added together and then heated in the presence of an inert solvent such as toluol in amounts sufficient to dissolve the same. This solution is maintained at a temperature of approximately 110° C. This heating is carried out under a condenser through which pass vapors which consist of some of the solvent and water of reaction as well as small amounts of unreacted amine. These products are caught in a collector from which the water of reaction is removed and the condensed toluol and collected amine are returned to the reacting vessel. The temperature of the mass is maintained at 110° C. under the aforesaid conditions until 1 mol of water is collected. Then a vacuum of approximately 30 mm. of mercury is applied to the reacting vessel and the temperature gradually raised to about 230° C. over a two hour period until all of the solvent and an additional mol of water have been removed. The resulting product is lauric cycloimidine and to all of said product is added 1 mol of monochloracetic acid and this mixture is heated to a temperature of approximately 120° C. whereupon the temperature of the mass will spontaneously rise to 170° C. By the application of external heat the mass is maintained at said temperature at approximately 170° C. until a one part sample thereof when dissolved in 100 parts of aqueous solution of sodium hydroxide having a pH of approximately 9 provides a clear solution. 1 mol of this cycloimidic acid so produced is added to an aqueous solution containing 1 mol of sodium hydroxide. The entire mass is heated to approximately 80° C. whereupon there is formed the sodium salt of substituted cycloimidinic acid of the following formula.

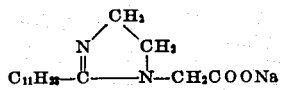

The sodium salt of the substituted cycloimidinic acid whose structural formula is shown in this Example may be produced in still another way which I prefer. Instead of adding the monochloracetic acid at the stage previously shown, there first may be prepared an aqueous solution containing 2 mols of sodium hydroxide and one mol of monochloracetic acid. The temperature of this solution is reduced below 15° C. and preferably 5 to 10° C. and while maintained at said reduced temperature and being constantly agitated there is added thereto one mol of the lauric cycloimidine. While being constantly agitated the temperature of the mass is raised over a one hour period to about 95° C. Then the temperature of this constantly agitated mass is maintained at 95° C. for an additional 3 hours or until a sample thereof in 100 parts of water will be clear and the pH is no longer subject to change on further heating of the mass at that temperature.

1 mol of the last defined compound is added to a solution containing 2 mols of caustic soda and one mol of chlorhydrin dissolved in water at a temperature not exceeding 15° C. and preferably between 5 to 10° C. After the addition at said low temperature, the mass is continuously agitated and while in the state of agitation its temperature is raised over about a one hour period to 95° C. and is further continuously agitated and maintained at said temperature for an additional 3 hours, all of this being done under a reflux condenser. During said 3 hour period the pH of the mass continuously decreases. At the expiration of that 4 hour period the pH of 1 part of the mass when dissolved in 100 parts of water will be 8.5. The 1 part sample when dissolved in 100 parts of water and having a pH of 8.5 in the water, provides a clear solution and is the same product as that of Example 1.

*Example 10*

By following the same procedure as that set forth in Example 9 with the only difference being that one mol of glycerine chlorhydrin (CH₂Cl—CHOH—CH₂OH) is substituted for the mol of chlorhydrin there is produced another one of my novel compounds having a formula the same as that of Example 1 except that CH₂CHOHCH₂ONa is substituted for C₂H₄ONa of Example 1.

*Example 11*

By following the same procedure as that set forth in Example 9 with the only difference being that one mol of pentaerythritol chlorhydrin [CH₂ClC(CH₂OH)₃] is substituted for the mol of chlorhydrin there is produced another one of my novel compounds having a formula the same as that of Example 1 except that —CH₂C(CH₂OH)₂ONa is substituted for —C₂H₄ONa of Example 1.

*Example 12*

By following the same procedure as that set forth in Example 9 with the only difference being that one mol of dimethylhydroxy ketone chlorhydrin (ClCH₂—COCH₂—OH) is employed instead of the one mol of monochlorhydrin there is produced another one of my novel compounds having a formula the same as that of Example 1, except that CH₂COCH₂ONa is substituted for C₂H₄ONa of Example 1. The ketone employed in this example may be prepared by employing the well-known method consisting essentially of the distillation of 2 mols of hydroxy acetic acid with one mol of calcium carbonate after which the ketone is chlorinated to provide the above reactant.

*Example 13*

By following the same procedure as that set forth in Example 9 with the only difference being that instead of employing one mol of monochlorhydrin there is employed one mol of the following compound

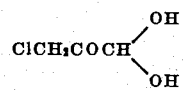

there is produced another one of my novel compounds having the same formula as that of Example 1, except that CH₂COCHOHONa is substituted for C₂H₄ONa of Example 1. The particular ketone reactant employed in this example may be produced by the distillation of one mol of dihydroxy acetic acid, one mol of hydroxy acetic acid and one mol of calcium carbonate after which the distillation product is chlorinated.

*Example 14*

By following the same procedure as that set forth in Example 9 with the only difference being that one mol of monochlorlactic acid (CH₂Cl—CHOH—COOH)

is employed instead of the one mol of monochloracetic acid so that there is produced still another of my novel compounds having the same formula as that of Example 1, except that CH₂CHOHCOONa is substituted for CH₂COONa of Example 1. In the production of this compound I prefer to use the aqueous method as set forth in Example 9 for the production of the salt of the cycloimidinic acid.

Since certain changes in carrying out the aforesaid processes and certain modifications in the compositions which embody the invention may be made without departing from its scope, it is intended that all matter contained in the description shall be interpreted as illustrative and not in a limiting sense.

I claim:
1. A novel compound of the following formula,

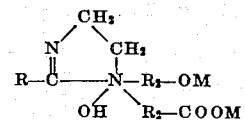

in which R is a hydrocarbon radical of at least 4 carbon atoms, R₂ is an organic group selected from the class consisting of (a) aliphatic hydrocarbon radicals of 1–4 carbon atoms, (b) hydroxy substituted aliphatic hydrocarbon radicals of 1–4 carbon atoms, (c) aliphatic hydrocarbon radicals having a single ether linkage and of 1–4 carbon atoms, and (d) hydroxy substituted aliphatic hydrocarbon radicals having a single ether linkage and of 1–4 carbon atoms, and M is an alkali metal.

2. A novel compound of the following formula,

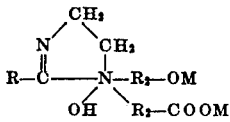

in which R is a hydrocarbon radical of at least 4 carbon atoms, $R_2$ is an aliphatic hydrocarbon radical of 1–4 carbon atoms and M is an alkali metal.

3. A novel compound of the following formula,

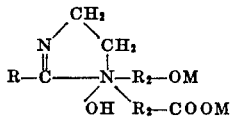

in which R is a hydrocarbon radical of 4–18 carbon atoms, $R_2$ is an aliphatic hydrocarbon radical of 1–4 carbon atoms and M is an alkali metal.

4. A novel compound of the following formula:

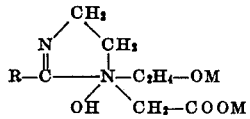

in which R is an hydrocarbon radical of at least 4 carbon atoms and M is an alkali metal.

5. A novel compound of the following formula:

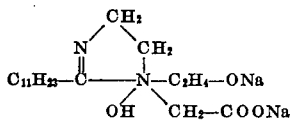

6. A novel compound of the following formula:

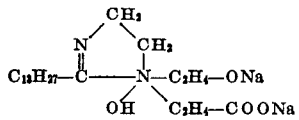

7. A novel compound of the following formula:

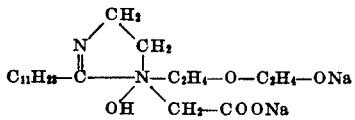

8. A novel compound of the following formula:

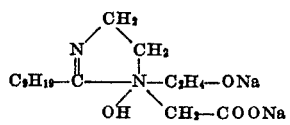

9. The method for producing an alkali metal salt of substituted quaternary hydroxy cycloimidinic acid alkali metal alcoholate comprising under reduced pressure conditions reacting 1 mol of a monocarboxylic acid having at least 4 carbon atoms in its radical connected to its COOH with 1 mol of aminoethylethanolamine, until 2 mols of water have been removed, then reacting 1 mol of the organic condensation reaction product so produced with one mol of monohalomonocarboxylic acid in an aqueous alkali solution containing 2.7–3 mols of an alkali selected from the group consisting of sodium hydroxide and potassium hydroxide.

10. The method of treating a cycloimidine produced by reacting one mole of a monocarboxylic acid having at least four carbon atoms in its radical connected to its COOH with one mole of aminoethylethanolamine, comprising heating an aqueous solution of one mole of said cycloimidine, one mole of a monohalomonocarboxylic acid and 2.2–2.5 moles of caustic soda, said heating continued until the pH of the solution is reduced to 8–8.5, then adding to said solution a quantity of caustic soda sufficient to make the sum of the caustic soda employed in the range of 2.7–3 moles and heating the resultant solution until a 1 part sample thereof dissolved in 100 parts of water provides clear solution which remains clear overnight.

11. The method of treating a cycloimidine produced by reacting one mole of capric acid with one mole of aminoethylethanolamine, comprising heating a mixture of one mole of said cycloimidine and an aqueous solution of 2.2–2.5 moles of caustic soda and one mole of monohalo carboxylic acid, said heating continued until the pH of the mass is reduced to 8–8.5 then adding to said mass a quantity of caustic soda sufficient to make the sum of the caustic soda employed in the range of 2.7–3 moles and heating the resultant mass until a one part sample thereof dissolved in 100 parts of water provides a clear solution which remains clear overnight.

12. The method of treating a cycloimidine produced by reacting one mole of lauric acid with one mole of aminoethylethanolamine, comprising heating a mixture of one mole of said cycloimidine and an aqueous solution of 2.2–2.5 moles of caustic soda and one mole of monohalo carboxylic acid, said heating continued until the pH of the mass is reduced to 8–8.5 then adding to said mass a quantity of caustic soda sufficient to make the sum of the caustic soda employed in the range of 2.7–3 moles and heating the resultant mass until a one part sample thereof dissolved in 100 parts of water provides a clear solution which remains clear overnight.

HANS S. MANNHEIMER.

REFERENCES CITED

The following references are of record in the file of this patent:

UNITED STATES PATENTS

| Number | Name | Date |
| --- | --- | --- |
| 2,267,965 | Wilson | Dec. 30, 1941 |
| 2,268,273 | Wilkes et al. | Dec. 30, 1941 |